United States Patent
Heath, III et al.

(10) Patent No.: US 11,273,582 B2
(45) Date of Patent: Mar. 15, 2022

(54) MULTI-SEGMENT MANDREL FOR PROCESSING A COMPOSITE PART AND METHOD FOR FABRICATING A COMPOSITE PART

(71) Applicant: The Boeing Company, Chicago, IL (US)

(72) Inventors: Richard E. Heath, III, Chicago, IL (US); Richard A. Prause, Chicago, IL (US)

(73) Assignee: The Boeing Company, Chicago, IL (US)

( * ) Notice: Subject to any disclaimer, the term of this patent is extended or adjusted under 35 U.S.C. 154(b) by 372 days.

(21) Appl. No.: 16/163,770

(22) Filed: Oct. 18, 2018

(65) Prior Publication Data

US 2020/0122363 A1    Apr. 23, 2020

(51) Int. Cl.
  *B29C 33/50* (2006.01)
  *B29C 70/44* (2006.01)
  (Continued)

(52) U.S. Cl.
  CPC .......... *B29C 33/505* (2013.01); *B29C 33/405* (2013.01); *B29C 33/76* (2013.01);
  (Continued)

(58) Field of Classification Search
  CPC ... B29C 33/505; B29C 33/405; B29C 70/446; B29C 33/76; B29C 33/485; B29C 70/44;
  (Continued)

(56) References Cited

U.S. PATENT DOCUMENTS 1,880,376 A * 10/1932 Dutton .................. B29C 33/302
  425/55
1,948,607 A * 2/1934 Abbott, Jr. ............ B29C 33/485
  425/54
(Continued)

FOREIGN PATENT DOCUMENTS

EP    2392714 A1 * 12/2011 ............. B29C 70/44
EP    3741546 A1 * 11/2020 ........... B29C 43/361

OTHER PUBLICATIONS

Microspheres: Fillers Filled with Possibilities : Composites World, retrieved from https://www.compositesworld.com/articles/microspheres-fillers-filled-with-possibilitieson on Aug. 17, 2018.
(Continued)

*Primary Examiner* — Leith S Shafi
(74) *Attorney, Agent, or Firm* — McDonnell Boehnen Hulbert & Berghoff LLP (57) ABSTRACT

An example mandrel for processing a part is described including a plurality of elastomeric components aligned end to end and spaced apart linearly to form a segmented mandrel body, and compressible interconnections positioned within spacing between adjacent elastomeric components and abutting the adjacent elastomeric components. The compressible interconnections allow the plurality of elastomeric components to expand axially due to thermal expansion resulting in a distribution of pressure. An example method for fabricating a composite part is also described including placing a base composite layer into a cavity of a tooling surface, inserting a mandrel into the cavity of the tooling surface such that the base composite layer is between the mandrel and the tooling surface, applying a skin to the mandrel and the base composite layer forming a package, enclosing the package in a vacuum bag and curing, and removing the mandrel from the cavity of the tooling surface.

20 Claims, 5 Drawing Sheets

(51) Int. Cl.
    *B29C 33/40*           (2006.01)
    *B29C 33/76*           (2006.01)
    *B29C 33/48*           (2006.01)
    *B29L 31/30*           (2006.01)
    *B29L 31/00*           (2006.01)

(52) U.S. Cl.
    CPC .......... *B29C 70/446* (2013.01); *B29C 33/485* (2013.01); *B29L 2031/3076* (2013.01); *B29L 2031/757* (2013.01)

(58) Field of Classification Search
    CPC ....... B29L 2031/3076; B29L 2031/757; B29K 2995/0094; B29K 2995/0046
    See application file for complete search history.

(56) References Cited

U.S. PATENT DOCUMENTS

| | | | | |
|---|---|---|---|---|
| 2,830,552 | A | * | 4/1958 | Ballauer ................. B23K 3/08 269/47 |
| 4,298,330 | A | * | 11/1981 | Davis ...................... B29C 33/76 425/392 |
| 6,325,958 | B1 | | 12/2001 | Lombardi et al. |
| 7,293,737 | B2 | | 11/2007 | Engwal et al. |
| 7,357,166 | B2 | | 4/2008 | Pham et al. |
| 8,534,339 | B2 | | 9/2013 | Pham et al. |
| 9,238,335 | B2 | | 1/2016 | Robins et al. |
| 9,327,467 | B2 | | 5/2016 | Robins et al. |
| 9,486,943 | B1 | | 11/2016 | Robins |
| 2007/0261788 | A1 | * | 11/2007 | Stenard ................. B29C 70/865 156/307.1 |
| 2009/0000726 | A1 | * | 1/2009 | McCowin ........... B32B 38/0012 156/212 |
| 2010/0006739 | A1 | * | 1/2010 | Robins ................. B29C 70/865 249/64 |
| 2011/0254267 | A1 | * | 10/2011 | Marengo ................. B29C 70/30 285/405 |
| 2011/0308711 | A1 | * | 12/2011 | Coleman ............... B29C 70/443 156/189 |
| 2012/0135197 | A1 | * | 5/2012 | Halford ............... B29C 33/3828 428/161 |
| 2015/0197065 | A1 | * | 7/2015 | Stewart ................. B30B 11/001 156/268 |
| 2015/0343714 | A1 | * | 12/2015 | Weimer ................ B29C 70/543 264/279 |
| 2016/0121560 | A1 | * | 5/2016 | Lee ....................... B29C 70/446 264/511 |
| 2016/0243730 | A1 | | 8/2016 | Robins et al. |
| 2017/0100859 | A1 | * | 4/2017 | Register ................. B29C 43/02 |
| 2018/0201009 | A1 | * | 7/2018 | Grieco .................... B29C 33/00 |

OTHER PUBLICATIONS

Expanel Microspheres—a Technical Presentation, AkzoNobel, 2012.

\* cited by examiner

MULTI-SEGMENT MANDREL FOR PROCESSING A COMPOSITE PART AND METHOD FOR FABRICATING A COMPOSITE PART

FIELD

The present disclosure generally relates to methods and equipment for fabricating composite parts, and more particularly to, a mandrel tool used in curing composite parts that includes multiple segments spaced apart linearly with compressible interconnections positioned therebetween to enable the segments to expand due to thermal expansion resulting in a distribution of pressure.

BACKGROUND

Mandrels may be used to layup, compress and/or cure a variety of parts that may possess one or more curves, contours, or surface features to which the mandrel needs to conform. For example, in the aircraft industry, stringers or stiffeners used in a fuselage or wings may be required to conform to composite skins that may be contoured and/or have surface features such as localized ply pad-ups or drop-offs. Thus, tooling to create these shapes can be complex due to the requirements of the structured.

In a specific example, to co-cure or co-bond the stiffener, such as a hat or omega stringer, to the skin as mentioned above, the mandrel tool is placed inside a cavity of the stiffener, and usually is caused to expand to consolidate the composite during cure to generate an appropriate pressure on the composite. Then, for the mandrel to be extracted, the mandrel contracts after cure to a smaller shape to provide clearance for extraction.

In the past, mandrels have been formed from flexible materials that allow the mandrel surface to conform to part contours. However, solid mandrels may not provide uniform pressure, in the cross-section or along the length of the part, during curing. Other mandrels, such as vented bladders, can leak during curing or may not apply consistent pressure during cure, which can create variations in stringer thickness in cross-section and along length.

Accordingly, there is a need for a lightweight, flexible mandrel that readily conforms to local part contours and which may be easily handled and removed after cure without need for special equipment. There is also a need for a lightweight flexible mandrel that is easily fabricated at low cost, is durable, and produces smooth part surface finishes.

SUMMARY

In one example, a mandrel for processing a part is described comprising a plurality of elastomeric components aligned end to end and spaced apart linearly to form a segmented mandrel body, and compressible interconnections positioned within spacing between adjacent elastomeric components and abutting the adjacent elastomeric components. The compressible interconnections allow the plurality of elastomeric components to expand axially due to thermal expansion resulting in a distribution of pressure.

In another example, a mandrel for processing a part is described comprising a plurality of elastomeric components aligned end to end and contacting each other to form a segmented mandrel body. Each elastomeric component of the plurality of elastomeric components comprise a first surface with a protrusion and a depression and a second surface, and the protrusion of the first surface abuts the second surface of an adjacent elastomeric component. The depression in the first surface allows the plurality of elastomeric components to expand axially due to thermal expansion resulting in a distribution of pressure.

In still another example, a method for fabricating a composite part is described comprising placing a base composite layer into a cavity of a tooling surface, and inserting a mandrel into the cavity of the tooling surface such that the base composite layer is between the mandrel and the tooling surface. The mandrel comprises a plurality of elastomeric components aligned end to end and spaced apart linearly to form a segmented mandrel body and compressible interconnections positioned within spacing between adjacent elastomeric components and abutting the adjacent elastomeric components. The method also comprises applying a skin to the mandrel and the base composite layer forming a package, and enclosing the package in a vacuum bag and curing the base composite layer and the skin. During curing, the compressible interconnections allow the plurality of elastomeric components to expand axially due to thermal expansion resulting in a distribution of pressure. The method also comprises removing the mandrel from the cavity of the tooling surface following the curing.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Existing internal rubber mandrels for fabrication of closed structure (hollow) composite parts may not apply a consistent pressure during cure to the composite part, which can create variations in thickness in cross section and along length of the composite part. During cure, some existing mandrels expand or contract inconsistently due in part to coefficient of thermal expansion (CTE) effects and geometric constraints, and thus, do not provide a uniform pressure to the composite part if the mandrel is not shaped and configured to an appropriate density. The mandrel may expand more in thicker areas than in thinner areas, or in instances in which the mandrel includes large holes providing internal voids for compression, such mandrels are difficult to handle and may not allow for tailoring of properties. Non-uniform expansion of a mandrel during cure causes bulging or problems with composite material around the mandrel.

Example mandrels described herein enable forming hollow composite components that are high quality by applying consistent internal pressure during fabrication. An example mandrel includes a plurality of elastomeric mandrels aligned end to end with compressible interconnections between adjacent segments. The compressible interconnections can include low density elastomeric foam or compressible standoffs, for example. The multi-segment mandrel can expand axially along an entire length of the mandrel, as well as radially, to distribute pressure during cure. This is beneficial because during curing of the composite part, the mandrel tends to expand differently at ends versus a center portion of the mandrel. Thus, allowing the segments of the mandrel to expand outward or axially reduces the possibility of the mandrel creating bulges in the composite part.

Example mandrels described herein can provide consistent and uniform pressure for curing of composite stiffeners in inner mode line (IML) tooling applied across a non-uniform cross section of the part, which improves existing part fabrication processes. For example, when using mandrels for curing of hat stiffeners in IML, tooling, pressure exerted by thermal expansion of the mandrel needs to be uniformly distributed regardless of the shape of the mandrel. If pressure is not evenly distributed, the resulting composite part will have unacceptable thickness variations (consolidation) that result from too much pressure in some areas and not enough pressure in other areas. Using the mandrel described herein, a unique geometry can be chosen for the mandrel as required by the composite part being fabricated, and pressure can be distributed due to the mandrel comprising multiple segments.

The mandrel can help to maintain the composite part at the substantially same size or same configuration at room temperature as well as in an autoclave at elevated temperature/pressure for an outside mode line (OML) part (e.g., so that part fibers are not distorted—bulging walls, radius growth, noodle shifting, etc.).

Figure 1:
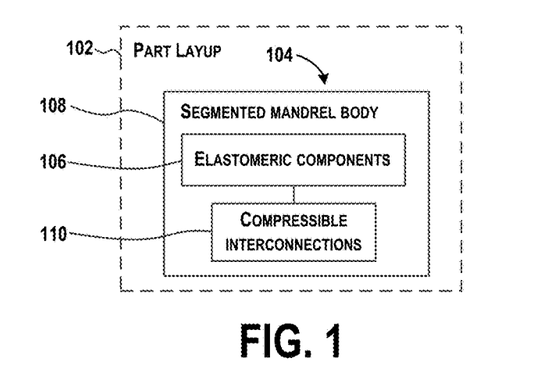
FIG. 1 illustrates a mandrel used for processing a part, such as to form and/or cure a part layup, according to an example implementation.

Referring now to FIG. 1, a mandrel 104 may be used for processing a part, such as to form and/or cure a part layup 102 comprising multiple plies (not shown) of fiber reinforced polymer resin. For example, multiple plies of fiber reinforced polymer plies are laid up over the mandrel 104 in order to form the plies into a desired part shape. The part layup 102 may partially or fully surround the mandrel 104, such that the mandrel 104 is at least substantially enclosed by the part layup 102.

Figure 16:
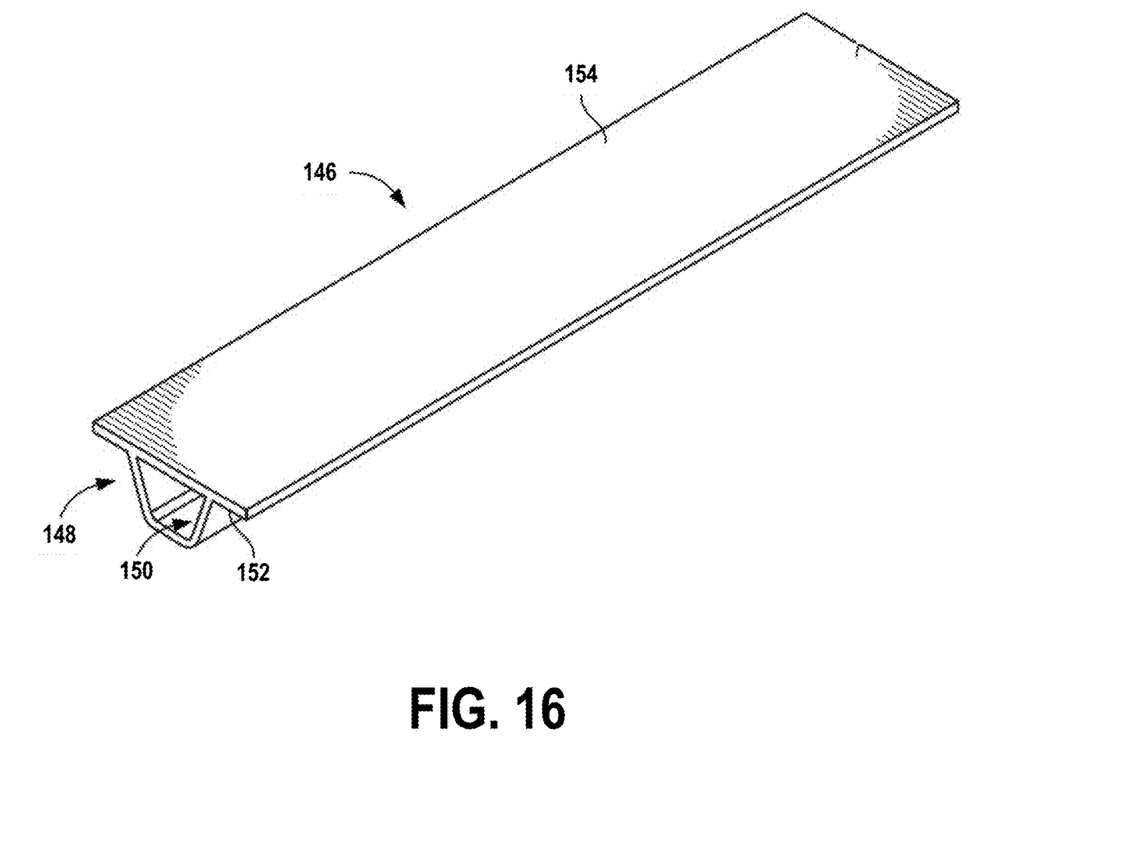
FIG. 16 illustrates an example stringer having an internal cavity by which the mandrel may be used for fabrication, according to an example implementation.

The part layup 102 may be cured to form any of a variety of composite components, structures, or parts that form full or partial enclosures having uniform or non-uniform cross sections along their lengths. For example, the cured part may comprise an integrally stiffened skin. As another example, the cured part may comprise a duct (not shown) or a conduit (not shown) used to transport fluids, such as, for example and without limitation, air ducts and fuel lines used in a wide variety of applications, including vehicles. An example of a composite component that may benefit from use of the mandrel 104 to form the part layup 102 is illustrated in FIG. 16 (described below).

The mandrel 104 includes a plurality of elastomeric components 106 aligned end to end and spaced apart linearly to form a segmented mandrel body 108, and compressible interconnections 110 positioned within spacing between adjacent elastomeric components and abutting the adjacent elastomeric components. The compressible interconnections 110 allow the plurality of elastomeric components 106 to expand axially due to thermal expansion resulting in a distribution of pressure.

Within some examples, the segmented mandrel body 108 includes an elongated mandrel body. The elongated mandrel body is useful for creating a mandrel of a size and shape as needed for a part, such as a stringer.

The plurality of elastomeric components 106 may be composed of an elastomeric material. The elastomeric material may include various materials, and the thus, the plurality of elastomeric components 106 may be formed from, for example, without limitation, a rubber material, a composite material, a silicone material, a fluoropolymer elastomer, and other combinations of materials. The elastomeric material may also include materials such as Teflon® (E.I. du Pont de Nemours and Company) coated silicone or hard rubber, and may be pliable to enable the elastomeric material to conform to various configurations. The elastomeric material may also include Viton™ or butyl rubber, as additional examples.

The plurality of elastomeric components 106 may be solid elastomer bodies, and may vary in density or thermal/mechanical properties. In one example, fabricating the mandrel 104 with multiple segments and each having different mechanical or thermal properties can help to enable uniform pressure distribution within the mandrel 104. Different mechanical properties can include density and stiffness, and materials for each of the plurality of elastomeric components 106 can be chosen as having specific properties. Thus, the mandrel 104 may be a dual density mandrel. Selection of materials to use for mandrel 104 can be made to balance stiffness and coefficient of thermal expansion (CTE) effects during cure. An optimization of pressure distribution can be determined by combining two different materials through a cross-section of the mandrel 104. As an example, a silicone soft layer can be selected for an outer layer of an elastomeric component, and a hard Viton™ material can be selected for an inner core to optimize properties.

For example, materials of the plurality of elastomeric components 106 may include different densities to enable some of the plurality of elastomeric components 106 to expand and compress differently for distribution of pressure. To create materials for use in the plurality of elastomeric components 106 having different mechanical properties (such as different densities), hollow micro-particles can be embedded within the materials that are used for the plurality of elastomeric components 106. A different distribution of hollow-microparticles can be used for some of the plurality of elastomeric components 106 to create segments having different densities, and thus, different mechanical properties.

As an example, a distribution of hollow micro-particles embedded within materials of some of the plurality of elastomeric components 106 can be selected such that there results in a distribution of voids being, for example, about 10% to about 30% void area in the plurality of elastomeric components 106 following creation of the micro-voids. Then, a different distribution of hollow micro-particles can be selected to be embedded in materials for other elastomeric components such that there results in a different distribution of voids being created. Density values of voids in the plurality of elastomeric components 106 can be selected such as between about 5% to 10% void area, 10% to 20% void area, 15% to 25% void area, 25% to 40% void area, etc. An amount of void area in the plurality of elastomeric components 106 is based on an amount of the hollow micro-particles embedded within the plurality of elastomeric components 106, and the amount of void area is related to a desired compression of the plurality of elastomeric components 106.

The hollow micro-particles deform in response to a change in a processing environment resulting in a distribution of voids in the materials. The voids further enable the material to be flexible and increase or decrease in volume when the mandrel 104 is subjected to the change in the processing environment. The hollow micro-particles can include polymer microspheres, or other collapsible microspheres. The polymer microspheres may include microspheres that crush under a threshold pressure resulting in the distribution of voids. The polymer microspheres may additionally or alternatively include microspheres that melt under a threshold temperature resulting in the distribution of voids. The polymer microspheres may include microspheres that melt under a threshold temperature resulting in the distribution of voids with residue of the polymer microspheres remaining.

The hollow micro-particles may range in size from about 0.1 μm to about 300 μm in diameter, and generally have a shape of a sphere. Other sizes or shapes are possible as well, such as between 1 μm to 100 μm in diameter, 10 μm to 50 μm in diameter, 100 μm to 200 μm in diameter, etc. When integrated into the plurality of elastomeric components 106, the hollow micro-particles provide a variety of enhancements and improvements including low density, improved dimensional stability, increased impact strength, smoother surface finish, greater thermal insulation, easier machinability, faster cycle times, and cost savings. The hollow micro-particles may comprise a wide variety of materials, including ceramics, plastic, glass, polymers, and metals and their properties can be tailored so that the hollow micro-particles create micro-voids within elastomer base material of the plurality of elastomeric components 106 when subjected to the change in the processing environment.

The compressible interconnections 110 may comprise the same or similar materials as the plurality of elastomeric components 106, such as elastomeric materials or any of the materials described above. In one example, the compressible interconnections 110 include elastomeric foam. In another example, the compressible interconnections 110 include compressible standoffs.

The plurality of elastomeric components 106 thus include a flexible housing forming a volume that may increase or decrease when the mandrel 104 is subjected to a change in a processing environment, such as to expand during a curing process of the part layup 102 to consolidate the composite laminate and generate an appropriate pressure on the laminate (e.g., to react to autoclave conditions or changing pressure and provide internal compaction). Then, for the mandrel 104 to be extracted, it will contract down after cure to a smaller size to provide clearance for extraction and to be withdrawn from the part layup 102 either after the part layup 102 is compacted and/or cured.

Within examples, the change in the processing environment includes a change in temperature (e.g. the cure temperature of the composite component), and thus, the plurality of elastomeric components 106 deform based on a threshold temperature applied to the mandrel 104 to enable uniform pressure distribution within the mandrel 104. An example threshold temperature may be within a range of about 200° F. to 400° F. Other threshold temperatures may be applicable as well based on the type of elastomeric material used, the type of optionally included hollow microparticles used, such as within a range of about 100° F. to 200° F., a range of about 150° F. to 300° F., a range of about 250° F. to 350° F., etc. Within further examples, the change in the processing environment includes a change in pressure, and thus, the plurality of elastomeric components 106 deform based on a threshold pressure applied to the mandrel 104 to enable uniform pressure distribution within the mandrel 104. An example threshold pressure may be within a range of about 100-200 psi.

Figure 2:
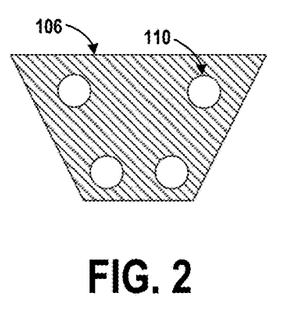
FIG. 2 illustrates an end cross-sectional view of one of the plurality of elastomeric components, according to an example implementation.

FIG. 2 illustrates an end cross-sectional view of one of the plurality of elastomeric components 106, according to an example implementation. In FIG. 2, the mandrel 104 is an upside down hat configuration to assist with former a composite stringer for an airplane. As shown in FIG. 2, the compressible interconnections 110 are included near corners of the elastomeric component; however, the compressible interconnections 110 can be positioned at other areas on the elastomeric component. The compressible interconnections 110 are shown to be horizontally aligned in rows, for example.

In addition, four compressible interconnections are shown; however, more or fewer compressible interconnections may be included.

Figure 3:
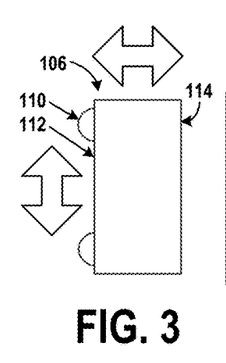
FIG. 3 illustrates a side view of one of the plurality of elastomeric components, according to an example implementation.

FIG. 3 illustrates a side view of one of the plurality of elastomeric components 106, according to an example implementation. The compressible interconnections 110 may be included or molded onto a first surface 112 of each of the plurality of elastomeric components 106, and the plurality of elastomeric components 106 are aligned end to end such that the first surface 112 of each of the plurality of elastomeric components 106 including the compressible interconnections 110 abuts a second surface 114 of the adjacent elastomeric components.

The compressible interconnections 110 are shown to be circular with rounded edges. This enables a smaller point of contact to a surface of the plurality of elastomeric components 106 for easier fabrication of the mandrel 104. This also enables a smaller footprint contacting the plurality of elastomeric components 106, and as the compressible interconnections 110 compress, more surface area of the compressible interconnections 110 then contacts the plurality of elastomeric components 106, allowing for consistent thermal expansion along the length of the mandrel and resulting in even distribution of pressure.

Figure 4:
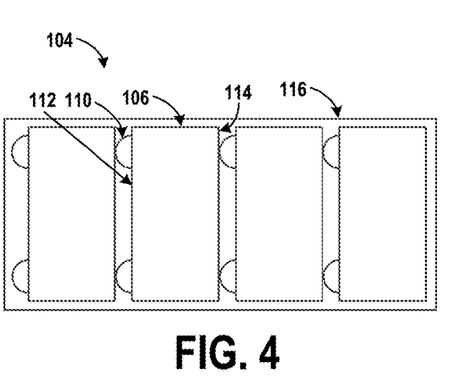
FIG. 4 illustrates a side view of the mandrel, according to an example implementation.

FIG. 4 illustrates a side view of the mandrel 104, according to an example implementation. In the example shown in FIG. 4, the mandrel 104 includes four elastomeric components 106 each aligned end to end such that the first surface 112 of each of the plurality of elastomeric components 106 including the compressible interconnections 110 abuts the second surface 114 of the adjacent elastomeric components. An enclosure 116 is shown surrounding the plurality of elastomeric components 106. The compressible interconnections 110 help to maintain spacing of the plurality of elastomeric components 106 within the enclosure 116. In one example, the enclosure 116 includes a fiber reinforced elastomer, and provides a smooth outside or exterior surface of the mandrel 104. After integrated together, plurality of elastomeric components 106 form the mandrel 104.

A spacing between adjacent elastomeric components can be set based on a size and shape of the mandrel 104. In one example, a spacing may include about 5% to about 20% of a length of the mandrel 104. An example width of one of the plurality of elastomeric components 106 may be about two inches, or may be in a range of about one to three inches depending on a material used. In a specific example, a spacing between adjacent elastomeric components may be between about 0.05 inches to about 0.125 inches. The spacing may be equivalent to a width of the compressible interconnections 110, and thus, for a larger spacing, a larger compressible interconnection can be used. An amount of spacing can thus be selected based on a size of the compressible interconnections 110. Within examples, the spacing should not be so large that a substantial gap results, which can allow a portion of the part layup 102 to deform into the gap.

The spacing provides a volume into which the plurality of elastomeric components 106 may expand during curing of the part layup 102. This can help prevent bulging of the part layup 102 by the mandrel 104, for example. The arrows shown in FIG. 3 illustrate that the plurality of elastomeric components 106 can thus expand in an axial manner along a length of the mandrel 104, as well as radially. The plurality of elastomeric components 106 and the compressible interconnections 110 further are compressible themselves enabling yet further distribution of pressure during curing of the part layup 102.

Figure 5:
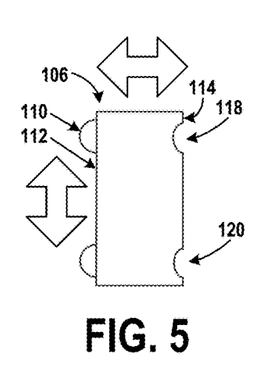
FIG. 5 illustrates a side view of one of the plurality of elastomeric components, according to another example implementation.

FIG. 5 illustrates a side view of one of the plurality of elastomeric components 106, according to another example implementation. In FIG. 5, the plurality of elastomeric components 106 include indentations 118 and 120 into which compressible interconnections of an adjacent elastomeric component fit when included within the mandrel 104. Although only two indentations are shown, the plurality of elastomeric components 106 include indentations for each compressible interconnection 110, and thus, can include four indentations (or more or fewer based on a number of compressible interconnections included on the elastomeric components). Thus, the compressible interconnections 110 mate with the indentations 118 and 120, and the compressible interconnections 110 and indentations 118 and 120 may act as male/female attachment mechanisms.

The indentations 118 and 120 hold the plurality of elastomeric components 106 in place within the enclosure 116, for example.

Figure 6:
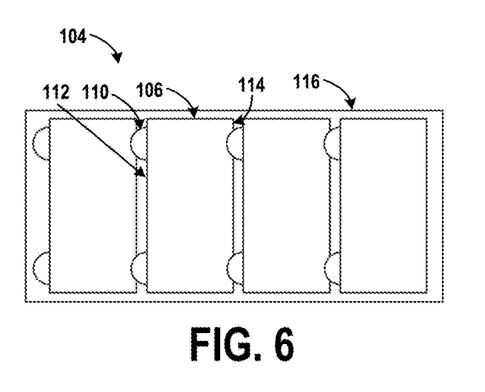
FIG. 6 illustrates a side view of the mandrel, according to another example implementation.

FIG. 6 illustrates a side view of the mandrel 104, according to another example implementation. In the example shown in FIG. 6, each of the plurality of elastomeric components 106 includes the indentations 118 and 120 into which the compressible interconnections 110 are mated.

Figure 7:
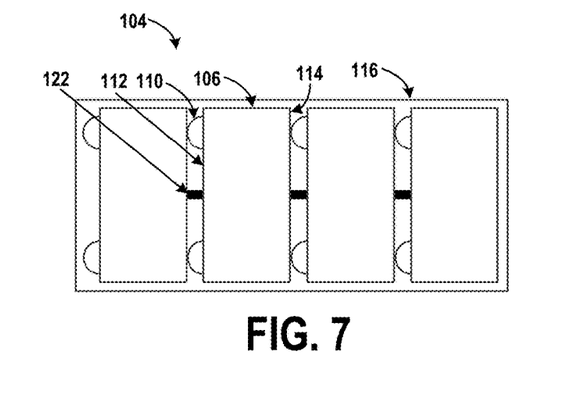
FIG. 7 illustrates a side view of the mandrel, according to another example implementation.

FIG. 7 illustrates a side view of the mandrel 104, according to another example implementation. In the example shown in FIG. 7, an internal rod 122 is included that couples each of the plurality of elastomeric components 106 to provide further structure to the mandrel 104. In some examples, the internal rod 122 is made of an elastomeric material to provide flexibility internal to the mandrel 104, for example. The internal rod 122 can be used rather than (or in addition to) the indentations 118 and 120 shown in FIG. 6 to hold the plurality of elastomeric components 106 in place in the enclosure 116.

The internal rod 122 is shown running through a middle or center portion of each of the plurality of elastomeric components 106. However, the internal rod 122 can be positioned at a side or bottom area of the plurality of elastomeric components 106 as well.

Figure 8:
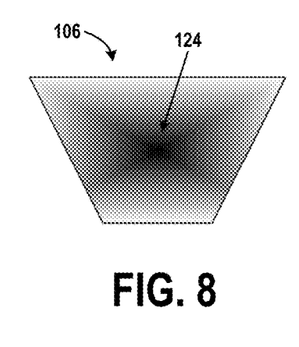
FIG. 8 illustrates an end cross-sectional view of one of the plurality of elastomeric components, according to another example implementation.

FIG. 8 illustrates an end cross-sectional view of one of the plurality of elastomeric components 106, according to another example implementation. In FIG. 8, the plurality of elastomeric components 106 include a depression 124, such as a cavity or a concave cupped end at the ends of each segment.

Figure 9:
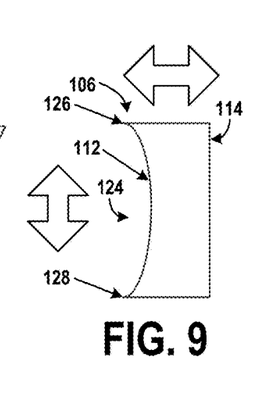
FIG. 9 illustrates a side view of one of the plurality of elastomeric components, according to another example implementation.

FIG. 9 illustrates a side view of one of the plurality of elastomeric components 106, according to another example implementation. The depression 124 is included within the first surface 112 of each of the plurality of elastomeric components 106, and the plurality of elastomeric components 106 are aligned end to end such that the first surface 112 of each of the plurality of elastomeric components 106 including the compressible interconnections 110 faces the second surface 114 of the adjacent elastomeric components. The first surface 112 includes a plurality of protrusions 126 and 128, which are outer edges of the plurality of elastomeric components 106 that touch to set and maintain spacing within the mandrel 104.

Figure 10:
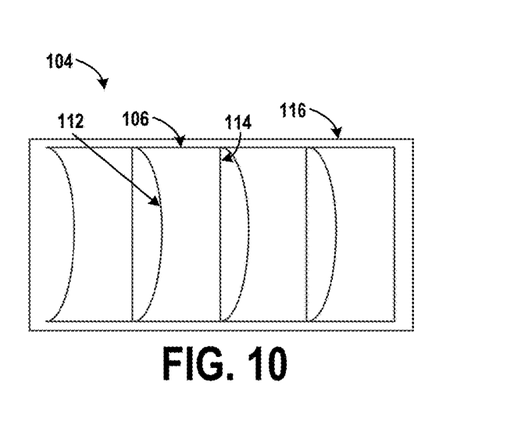
FIG. 10 illustrates a side view of the mandrel, according to another example implementation.

FIG. 10 illustrates a side view of the mandrel 104, according to another example implementation. In the example shown in FIG. 10, the depression 124 in the first surface 112 allows the plurality of elastomeric components 106 to expand axially due to thermal expansion resulting in a distribution of pressure. The depression 124 thus provides a space or volume into which an adjacent elastomeric component can expand in an axial manner. The plurality of protrusions 126 and 128 include a first protrusion 126 and a second protrusion 128 that contact the second surface 114 of the adjacent elastomeric component.

Figure 11:
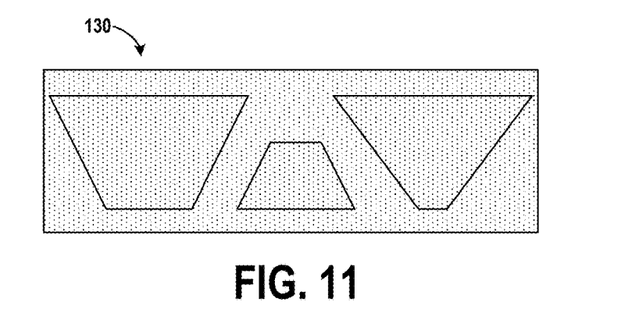
FIG. 11 illustrates a block of elastomer, and an outline of example elastomeric components to cut out of the block, according to an example implementation.

FIG. 11 illustrates a block 130 of elastomer, and an outline of example elastomeric components to cut out of the block 130, according to an example implementation. The plurality of elastomeric components 106 may be machined out of the block 130 by cutting a shape out and removing an internal portion, for example.

In one example, the block 130 of elastomer can be fabricated with embedded micro-particles (which can be subjected to pressure and/or temperature thresholds to create the internal micro-voids), and then custom cross sections can be machined/cut out of the block. Manufacturing of the mandrel 104 may then be less expensive and may reduce non-recurring tooling costs. Manufacturing of the mandrel 104 may also be faster as compared to vented bladders, as well as provide cost avoidance from eliminating a risk of leaks associated with vented bladders. A film can be added to the mandrel to provide a smooth surface finish in instances in which machine cuts may create rough edges, for example.

In addition, mandrels are normally fabricated using a casting, however, the mandrel 104 described herein may be manufactured by creating the plurality of elastomeric components 106 and/or the compressible interconnections 110 as shown in FIG. 11 without casting to make mandrels of different geometries. Again, this can help to lower manufacturing costs of the mandrel 104.

The block 130 can be fabricated and designed to have a specific density by mixing hollow micro-particles with silicon to achieve a uniform distribution of the hollow micro-particles within the silicon resulting in a silicon slurry mix, and then positioning the silicon slurry mix into a mold. The mold can be any shape, such as that of the block 130 shown in FIG. 11. Following, the mold is cured, and the plurality of elastomeric components 106 can be cut from the mold.

Following, for fabricating the mandrel 104 the plurality of elastomeric components 106 are aligned end to end and spaced apart linearly to form the segmented mandrel body 108, and then compressible interconnections 110 are positioned within spacing between adjacent elastomeric components and abut the adjacent elastomeric components. The compressible interconnections 110 can be glued or attached to the plurality of elastomeric components 106. Alternatively, the compressible interconnections 110 can be machined out of the block 130 onto the plurality of elastomeric components 106, such that the compressible interconnections 110 and the plurality of elastomeric components 106 are integral (single or discrete) components. The plurality of elastomeric components 106 can be surrounded with the enclosure 116, and the compressible interconnections 110 maintain spacing of the plurality of elastomeric components 106 within the enclosure 116.

In operation for curing a composite part, the plurality of elastomeric components 106 will grow in size due to coefficient of thermal expansion (CTE) effects, which creates pressure inside the trapped volume of the hollow part. In an example, a 20% expansion may be experienced by the plurality of elastomeric components 106 at 360° F., which generate 90 psi. With the compressible interconnections 110 providing spacing between the plurality of elastomeric components 106, this enables the plurality of elastomeric components 106 to expand within the enclosure 116 and compress each other as well. Expansion and compression of the plurality of elastomeric components 106 helps during cure of the composite part so that the mandrel 104 does not push the composite part away and cause bulging.

In an example use case, the mandrel 104 may be used for curing composite hat stiffeners for an aircraft. Hat stiffeners are commonly used in composite structures, and tooling to create these shapes can be complex due to requirements of the structure. To co-cure or co-bond the hat stiffener to a skin, the mandrel 104 is placed inside a cavity of the hat stiffener. The mandrel 104 generally expands to consolidate the composite laminate during cure to generate an appropriate pressure on the laminate. Then, the mandrel 104 contracts down after cure to a smaller shape to provide clearance for extraction.

Thus, during cure, the mandrel 104 provides an even pressure distribution across the hat/skin cross section, and pressure generated by the mandrel 104 substantially matches external pressure of a processing environment in which the part is curing (e.g., autoclave pressure, ambient pressure, etc.). After cure, the mandrel 104 decreases in size than the hat stiffener cured geometry allowing removal.

Figure 12:
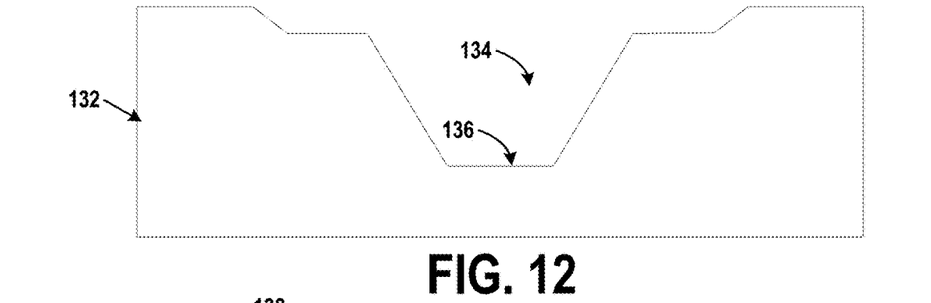
FIG. 12 illustrates an end cross-sectional view of a tool used in the fabrication of the composite part, according to an example implementation.

FIGS. 12-15 illustrate an example process flow for fabrication of a composite part, according to an example implementation. The illustrations in FIGS. 12-15 illustrate end cross-sectional views of elements used in the fabrication of the composite part. Initially, as shown in FIG. 12, a tool 132 is shown that includes a cavity 134 and a tooling surface 136. The cavity 134 is shaped and sized according to a hollow cavity as desired for the composite part.

Figure 13:
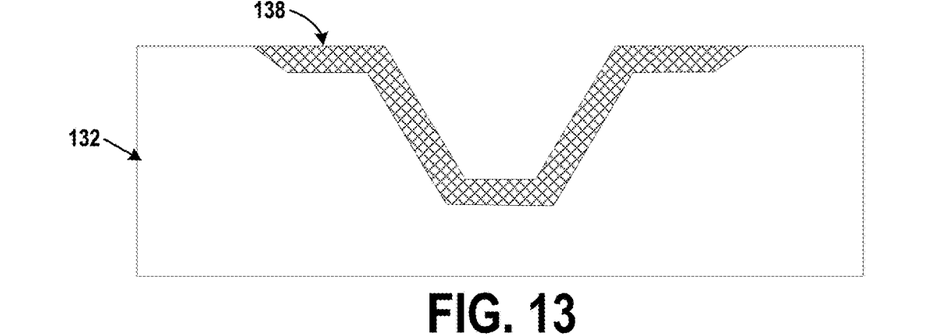
FIG. 13 illustrates an end cross-sectional view of a base composite layer placed into the cavity of the tool, according to an example implementation.
Figure 14:
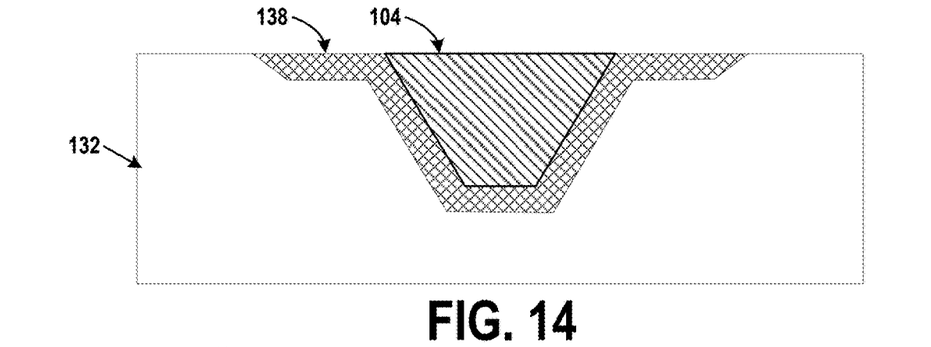
FIG. 14 illustrates an end cross-sectional view of the mandrel inserted into the cavity of the tool, according to an example implementation.

Next, as shown in FIG. 13, a base composite layer 138 is placed into the cavity 134 and onto the tooling surface 136. Following, as shown in FIG. 14, the mandrel 104 is inserted into the cavity 134 of the tooling surface 136 such that the base composite layer 138 is between the mandrel 104 and the tooling surface 136.

Figure 15:
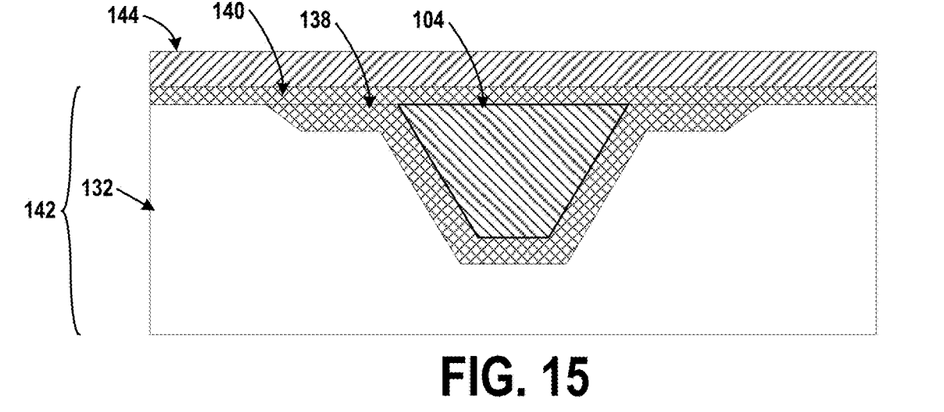
FIG. 15 illustrates an end cross-sectional view of a skin applied to the mandrel and the base composite layer forming a package, according to an example implementation.

As shown in FIG. 15, a skin 140 is applied to the mandrel 104 and the base composite layer 138 forming a package 142. Then, the package 142 is enclosed in a vacuum bag 144, and the base composite layer 138 and the skin 140 are co-cured. During curing, the plurality of elastomeric components 106 of the mandrel 104 expand or compress to enable uniform pressure distribution within the mandrel 104, which allows the mandrel 104 to expand and not cause bulging of the skin 140. For example, the plurality of elastomeric components 106 can expand into a volume provided by the spacing due to the compressible interconnections 110. Following curing, the mandrel 104 is removed from the cavity 134 of the tooling surface 136.

The mandrel 104 thus applies pressure to the base composite layer 138 and the skin 140 during layup and curing so as to form a hat stiffener. The mandrel 104 defines and maintains a shape of the hat stiffener during curing, with substantially even pressure and without substantial distortion. As shown, the mandrel 104 has a substantially trapezoidal cross sectional shape, generally matching that of the hat stiffener. However, the mandrel 104 may possess any of a variety of cross sectional shapes depending on an application and a particular shape of the composite structure layup. The mandrel 104 also includes a generally solid body that extends a length of the hat stiffener.

During the thermal cycling used to effect co-curing of the base composite layer 138 and the skin 140, substantially uniform expansion of the mandrel 104 occurs, and the plurality of elastomeric components 106 can expand and compress internally within the mandrel 104.

FIG. 16 illustrates an example stringer 146 (e.g., composite resin part) having an internal cavity by which the mandrel 104 may be used for fabrication, according to an example implementation. For example, and without limitation, the mandrel 104 and curing method may be used in fabrication of a fiber reinforced composite resin stringer as shown in FIG. 16. In one arrangement, the stringer 146 may comprise a multi-ply layup of prepreg. In the illustrated arrangement, the stringer 146 comprises a hat section 148 forming an internal stringer cavity 150, a pair of laterally extending flange sections 152, and a substantially flat skin section 154 that is consolidated together with the flange sections 152 during curing. As those of ordinary skill in the art will recognize, alternative stringer geometries are possible.

The stringer 146 may be fabricated using the mandrel 104, as described in FIGS. 12-15. After curing, the part layup 102 of FIG. 1 forms the stringer 146. The mandrel 104 fills the stringer cavity 150 that is a hollow trapezoidal space.

Example composite material used for the stringer 146 may be generally a lightweight material, such as an uncured pre-impregnated reinforcing tape or fabric (i.e., "prepreg"). The tape or fabric can include a plurality of fibers such as graphite fibers that are embedded within a matrix material, such as a polymer, e.g., an epoxy or phenolic. The tape or fabric could be unidirectional or woven depending on a degree of reinforcement desired. Thus, the prepreg tape or fabric is laid onto the mandrel 104 (or mold) to pre-form the tape or fabric into a desired shape of the stringer 146 as defined by the mandrel 104. The stringer 146 could be any suitable dimension to provide various degrees of reinforcement, and could comprise any number of plies of prepreg tape or fabric.

The mandrel 104 enables fabrication of high quality stringers by applying consistent internal pressure during fabrication. The mandrel 104 also enables easier extraction after cure due to increased compression abilities from the micro-voids.

In addition, the mandrel 104 is not just useful during curing of the stringer 146, but also, the mandrel 104 is consistent in size at room temperatures as well to help provide a consistent structure on which the fibers can be positioned. Small changes in temperature will not affect positioning of the fibers through use of the mandrel 104 during the assembly of the stringer (or other example part) prior to cure.

Within the examples described above, the mandrel 104 provides for improved fabrication of closed composite structures (such as hat stringers) due to the mandrel 104 formed using the plurality of elastomeric components 106 aligned end to end and spaced apart by the compressible interconnections 110. By selecting properties of the compressible interconnections (such as degree of loading, density, size, composition, etc.), a performance of the mandrel 104 can be optimized to ensure high quality part fabrication. The mandrel 104 can also be used in other applications for fabrication of other types of composite structures.

Figure 17:
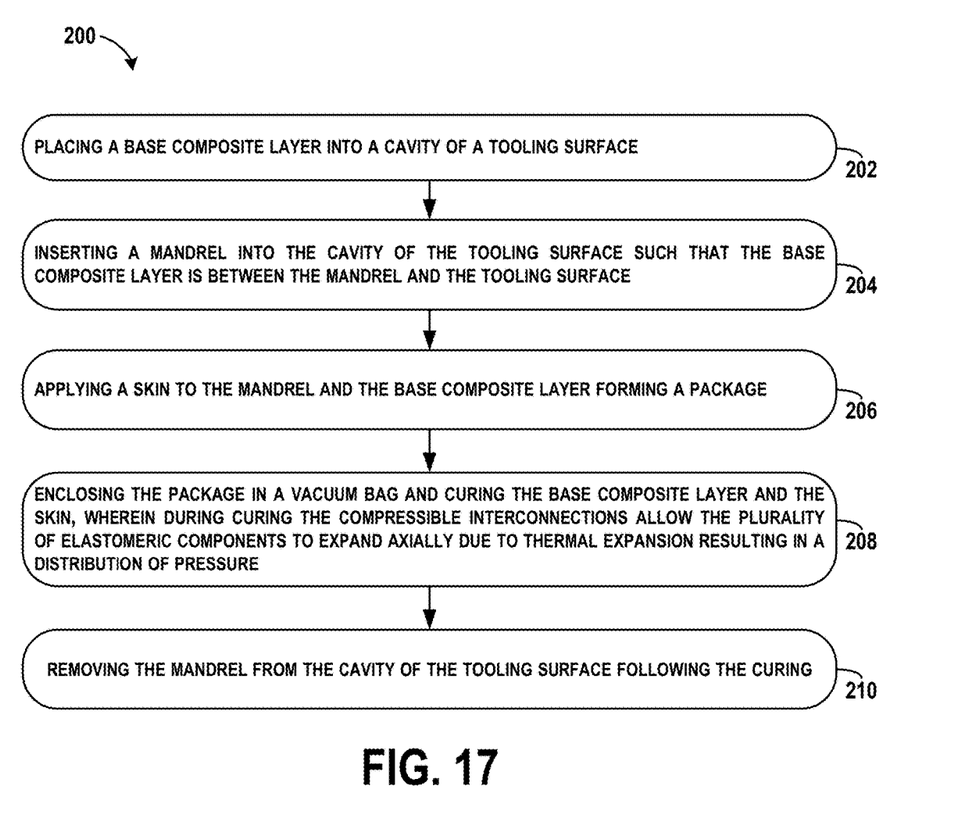
FIG. 17 shows a flowchart of an example method for fabricating a composite part, according to an example implementation.

FIG. 17 shows a flowchart of an example method 200 for fabricating a composite part (e.g., such as the stringer 146), according to an example implementation. Method 200 shown in FIG. 17 presents an example of a method that, for example, could be used with the mandrel 104 shown in FIG. 1, for example, and may be performed with components illustrated in FIG. 1. In some examples, components may be arranged to be adapted to, capable of, or suited for performing the functions, such as when operated in a specific manner. Method 200 may include one or more operations, functions, or actions as illustrated by one or more of blocks 202-210. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes placing the base composite layer 138 into the cavity 134 of the tooling surface 136. At block 204, the method 200 includes inserting the mandrel 104 into the cavity 134 of the tooling surface 136 such that the base composite layer 138 is between the mandrel 104 and the tooling surface 136. At block 206, the method 200 includes applying the skin 140 to the mandrel 104 and the base composite layer 138 forming the package 142. At block 208, the method 200 includes enclosing the package 142 in the vacuum bag 144 and curing the base composite layer 138 and the skin 140. During curing, the compressible interconnections 110 allow the plurality of elastomeric components 106 to expand axially due to thermal expansion resulting in a distribution of pressure. At block 210, the method 200 includes removing the mandrel 104 from the cavity 134 of the tooling surface 136 following the curing.

Figure 18:
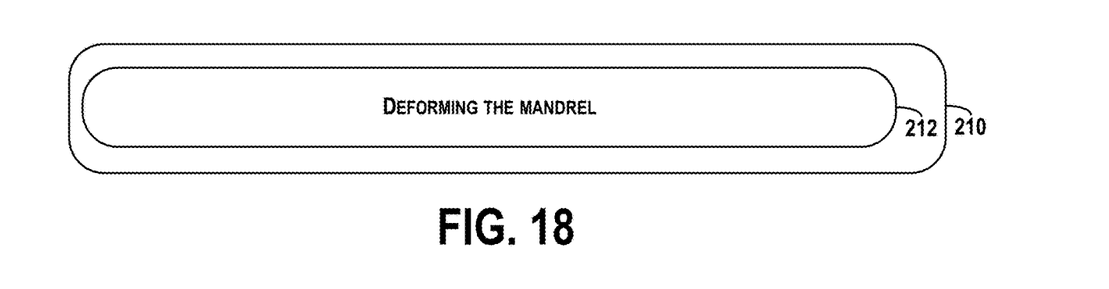
FIG. 18 shows a flowchart of an example method for removing the mandrel as shown in FIG. 17, according to an example implementation.

FIG. 18 shows a flowchart of an example method for removing the mandrel 104 as shown in block 210 of FIG. 12, according to an example implementation. At block 212, functions include deforming the mandrel 104.

As used herein, by the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), apparatus(es), and method(s) disclosed herein include a variety of components, features, and functionalities. It should be understood that the various examples of the system(s), apparatus(es), and method(s) disclosed herein may include any of the components, features, and functionalities of any of the other examples of the system(s), apparatus(es), and method(s) disclosed herein in any combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A mandrel for processing a part, the mandrel comprising elastomeric components, aligned end to end and linearly spaced apart from each other to form a segmented mandrel body, wherein:
- each of the elastomeric components comprises a first surface and a second surface,
- the first surface comprises protrusions, and
- the protrusions of the first surface contact the second surface of an adjacent one of the elastomeric components to maintain spacing between the elastomeric components.

2. The mandrel of claim 1, wherein the elastomeric components comprise solid elastomer bodies.

3. The mandrel of claim 1, wherein spacing between adjacent ones of the elastomeric components is about 5% to about 20% of a length of the mandrel.

4. The mandrel of claim 1, wherein spacing between adjacent ones of the elastomeric components is between about 0.05 inches to about 0.125 inches.

5. The mandrel of claim 1, further comprising an enclosure, surrounding the elastomeric components, wherein the protrusions of the first surface maintain spacing of the elastomeric components within the enclosure.

6. The mandrel of claim 5, wherein the enclosure comprises a fiber reinforced elastomer.

7. The mandrel of claim 1, further comprising an internal rod, coupling each of the elastomeric components to each other to provide further structure to the mandrel.

8. The mandrel of claim 1, wherein:
- the elastomeric components comprise different materials, having thermal properties; and
- the thermal properties, corresponding to the different materials, are different from one another.

9. A mandrel for processing a part, the mandrel comprising elastomeric components, aligned end to end and contacting each other to form a segmented mandrel body,
wherein
- each of the elastomeric components comprises a first surface and a second surface,
- the first surface comprises a protrusion and a depression,
- the protrusion of the first surface abuts the second surface of an adjacent one of the elastomeric components, and
- the depression in the first surface provides a volume, into which the adjacent one of the elastomeric components expands axially due to thermal expansion.

10. The mandrel of claim 9, wherein the first surface comprises a plurality of protrusions.

11. The mandrel of claim 10, wherein the first surface comprises a cavity resulting in the depression, and wherein outer edges of the cavity comprise a first protrusion and a second protrusion of the plurality of protrusions.

12. The mandrel of claim 11, wherein the first protrusion and the second protrusion contact the second surface of the adjacent one of the elastomeric components.

13. The mandrel of claim 9, wherein the elastomeric components comprise solid elastomer bodies.

14. The mandrel of claim 9, further comprising an enclosure surrounding the elastomeric components.

15. The mandrel of claim 9, wherein:
- the elastomeric components comprise different materials, having thermal properties; and
- the thermal properties, corresponding to the different materials, are different from one another.

16. The mandrel of claim 1, further comprising an internal rod, passing through a center portion of each of the elastomeric components and coupling each of the elastomeric components to each other.

17. The mandrel of claim 1, wherein the protrusions of the first surface comprise outer edges of the elastomeric components that maintain spacing between the elastomeric components within the mandrel.

18. The mandrel of claim 1, further comprising compressible interconnections, positioned within a space between adjacent ones of the elastomeric components, wherein the compressible interconnections allow the elastomeric components to expand axially.

19. The mandrel of claim 18, wherein the compressible interconnections comprise elastomeric foam.

20. The mandrel of claim 18, wherein the compressible interconnections comprise compressible standoffs.

* * * * *